United States Patent [19]

Suzuki

[11] Patent Number: 4,953,103

[45] Date of Patent: Aug. 28, 1990

[54] PAGE PRINTER

[75] Inventor: Masahiro Suzuki, Tokyo, Japan

[73] Assignees: Oki Electric Industry Co., Ltd., Tokyo, Japan; Hughes Aircraft Company, Los Angeles, Calif.

[21] Appl. No.: 345,397

[22] Filed: Apr. 28, 1989

[30] Foreign Application Priority Data

Apr. 30, 1988 [JP] Japan .................. 63-105535

[51] Int. Cl.⁵ .................................. G06F 15/00
[52] U.S. Cl. ..................... 364/519; 364/239.1 MS; 364/200
[58] Field of Search .................. 364/518-523, 364/200, 239.1 MS File; 346/154

[56] References Cited

U.S. PATENT DOCUMENTS 4,729,107  3/1988  Hasegawa ................. 364/519
4,757,462  7/1988  Sato et al. ................ 364/519

Primary Examiner—Arthur G. Evans
Attorney, Agent, or Firm—Panitch Schwarze Jacobs & Nadel

[57] ABSTRACT

A page printer with an internal CPU, interrupt controller, and DMAC has a DMA stopping circuit in the DMAC, the function of which is to stop a DMA transfer in response to a DMA stop signal and restart it in response to a DMA restart signal. The DMA signal is generated by the interrupt controller when it receives certain interrupt requests, such as communication interrupt requests, enabling the CPU to service these requests promptly. The DMA restart signal is generated at the end of the interrupt service routine. This arrangement permits DMA transfers to be performed in burst mode, stopping only when urgent interrupt service is required. Burst-mode DMA improves the speed of operation of the printer.

8 Claims, 5 Drawing Sheets

PAGE PRINTER

BACKGROUND OF THE INVENTION

This invention relates to a page printer, more particularly to a page printer with means for temporarily stopping direct memory access.

Page printers such as laser printers are widely used as output devices of computers, enabling small desktop publishing systems, for example, to produce text and graphics output with high quality and variety. A page printer prints a page by a scanning process in which a laser beam, for example, is switched on or off for each dot on the page, the number of dots being typically 300 per inch in both the horizontal and vertical directions. The switching is performed according to data comprising at least one bit for each dot on the page.

The operation of a page printer is controlled by a built-in microprocessor or similar central processing unit, hereinafter referred to as a CPU. A page printer also has various internal memories, such as a character pattern memory in which the dot patterns of characters are stored, and a frame or strip buffer memory in which the printer creates the dot pattern for an entire page, or a strip on the page. Since large amounts of dot data must be transferred between these memories, a page printer also has a direct memory access controller, hereinafter referred to as a DMAC, which is a device for transferring data to or from a memory at high speed without requiring intervention by the CPU.

The CPU, DMAC, and memories are interconnected by a bus over which data can be transferred a word at a time. (A word typically comprises 8, 16, or 32 bits.) During a direct memory access (hereinafter DMA) operation the bus is controlled by the DMAC and cannot be used by the CPU; that is, the CPU cannot operate.

Some scheme is necessary to ensure that the CPU will not be disabled for extended periods of time by long DMA operations, leaving it unable to deal with exigencies such as the arrival of new data from the computer. A typical scheme used in prior-art page printers is cycle stealing, in which the DMAC transfers data one word at a time, returning the bus to the CPU after each word.

Compared with the burst mode, in which the DMAC transfers data continuously, the cycle-stealing mode has many disadvantages. One is that, since CPU cycles are interspersed between the DMA cycles, a cycle-stealing DMA transfer takes longer to complete than a burst-mode DMA transfer. Another is that extra overhead cycles are required to transfer the bus right repeatedly between the CPU and DMAC. A third is that when CPU processing is contingent on the completion of the current DMA transfer, the CPU cycles inserted between the DMA cycles are wasted; during them the CPU does nothing but wait for the DMA transfer to end.

SUMMARY OF THE INVENTION

An object of the present invention is accordingly to enable DMA transfers in a page printer to be performed in burst mode, without disabling operations by the CPU.

A page printer according to this invention comprises an interface circuit for receiving data from external apparatus and generating interrupt request signals, a bus for transferring data among the interface and other circuit blocks in the printer, a character pattern memory for storing data such as character patterns, a frame buffer memory for reading and writing data, a read-out circuit for reading data from the frame buffer memory, a mechanical control circuit for receiving information from the read-out circuit and generating control signals, a printing mechanism for printing according to these control signals, a CPU for receiving interrupt request signals, processing data, and generating signals such as a DMA request signal and a DMA restart signal, a BitBlt circuit for performing DMA transfers in response to the DMA request signal, a DMA stopping circuit, disposed in the BitBlt circuit, for stopping and restarting DMA transfers in response to a DMA stop signal and the DMA restart signal, an interrupt controller for relaying interrupt request signals to the CPU, and a DMA stop signal generating circuit, disposed in the interrupt controller, for generating the DMA stop signal when certain interrupt request signals are relayed to the CPU.

DETAILED DESCRIPTION OF THE EMBODIMENTS

A novel page printer according to this invention will be described with reference to the drawings.

Figure 1:
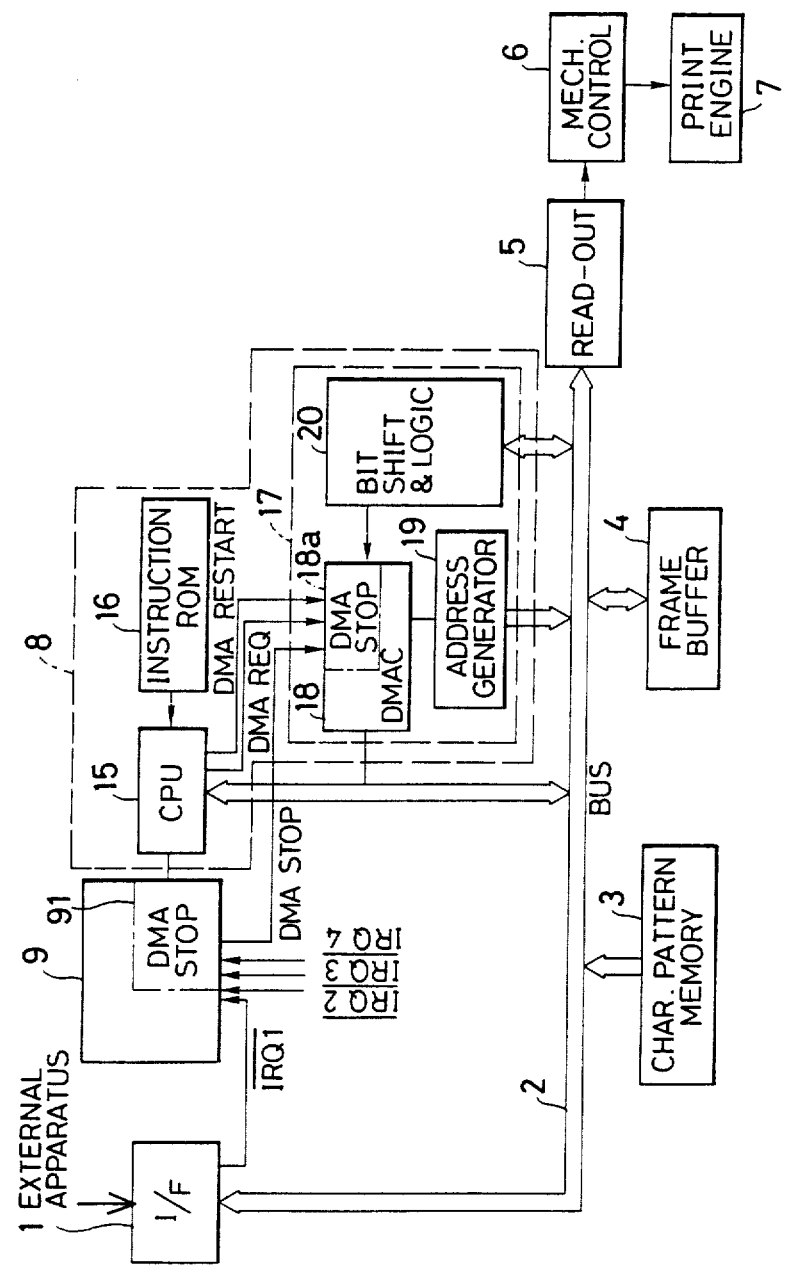
FIG. 1 is a block diagram of a page printer according to this invention.

FIG. 1 is a block diagram illustrating the structure of the novel page printer, which comprises an interface circuit 1, a bus 2, a character pattern memory 3, a frame buffer memory 4, a read-out circuit 5, a mechanical control circuit 6, a printing mechanism 7, a main controller 8, and an interrupt controller 9. The interface circuit 1 receives incoming data from external apparatus, temporarily stores the received data, and generates an interrupt request signal reporting the reception of a complete data byte. The bus 2 is a collection of signal lines interconnecting the interface circuit 1 and other circuit blocks in FIG. 1, for the interchange of information among these blocks. The character pattern memory 3, which is connected to the bus 2, comprises memory devices such as RAM or ROM chips storing information such as character patterns which can be placed a word at a time on the bus 2. The frame buffer memory 4, which is also connected to the bus 2, comprises memory devices such as RAM chips which can be written and read a word at a time via the bus 2. The read-out circuit 5, which is also connected to the bus 2, is a device for reading information from the frame buffer memory 4 a word at a time in synchronization with the operation of the printing mechanism 7 and transferring the information to the mechanical control circuit 6. The mechanical control circuit 6 monitors the status of the printing mechanism 7 and generates control signals according to this status and the information received from the read-out circuit 5. The printing mechanism 7, which is connected to the mechanical control circuit 6, comprises a print engine that prints characters and graphics on paper according to these control signals. The main controller 8, which is connected to the bus 2, is a circuit that receives interrupt request signals from the interrupt controller and performs data-processing functions such as controlling the transfer of data from the character pattern memory 3 to the frame buffer memory 4 and generating new data to be written on the frame buffer memory 4. The interrupt controller 9 receives interrupt request signals from the interface circuit 1 and other devices not shown in the drawing, selects among these request according to a priority order, sends the selected interrupt request signal to the main controller, and generates DMA stop signals which it sends to the main controller 8 when certain interrupt requests are requested.

The interface circuit 1 is a well-known circuit employing a standard interface such as the RS-232C interface or Centronics interface. The bus 2, character pattern memory 3, frame buffer memory 4, read-out circuit 5, mechanical control circuit 6, and printing mechanism 7 are also well-known devices, detailed descriptions of which will be omitted here.

The general operation of the novel page printer can be described as follows. The external apparatus, which is normally a computer, sends the page printer data indicating, for example, characters to be printed. The interface circuit 1 receives these data a bit or byte at a time. For each complete byte received, the interface circuit 1 sends an interrupt request signal to the interrupt controller 9, which relays it to the main controller 8. The main controller 8 then reads the byte of data from the interface circuit 1 and writes it in a buffer area in, for example, the frame buffer memory 4.

The interface circuit 1 receives data at a rate of, for example, 19.2K bits per second and is capable of storing only a limited number of bytes internally: only two bytes, for example, including the byte currently being received. The main controller 8 must therefore read each received byte promptly, before it is lost.

Having read and stored a received data byte, the main controller 8 processes it by calculating, for example, the address in the character pattern memory 3 at which corresponding character pattern is stored, the location at which the character should be printed on the page, and the address in the frame buffer memory 4 to which this location corresponds, then transferring the dot pattern data from the calculated address in the character pattern memory 3 to the calculated address in the frame buffer memory 4. When the dot patterns for an entire page or strip have been created in the frame buffer memory 4, the read-out circuit 5 reads them and sends them to the mechanical control circuit 6, which generates corresponding electrical signals to control the printing mechanism 7, causing the printing mechanism 7 to print the corresponding characters on the page.

Next the structure and operation of the main controller 8 will be described in more detail. As shown in FIG. 1, the main controller 8 comprises a CPU 15, an instruction ROM 16, and a bit block transfer circuit 17. (A bit block transfer is commonly termed a BitBlt; this abbreviation will be employed herein.) The CPU 15 receives the interrupt request signals received by the main controller 8. It also executes programs stored in the instruction ROM 16, which cause it to process data as already described and to generate signals, such as a DMA request signal and a DMA restart signal which it sends to the BitBlt circuit 17. The CPU 15 uses the bus 2 to transfer data. The BitBlt circuit 17 is a circuit for transferring blocks of data from the character pattern memory 3 to the frame buffer memory 4 via the bus 2, without requiring the operation of the CPU 15. Since the CPU 15 and the BitBlt circuit 17 both require the bus 2, only one of them can operate at a time.

Normally the CPU 15 is active and the BitBlt circuit 17 is inactive. When it becomes necessary to transfer a block of data from the character pattern memory 3 to the frame buffer memory 4, the CPU 15 first sends the BitBlt circuit 17 information indicating the location and size of the block in the character pattern memory 3 and the destination location to which it is to be transferred in the frame buffer memory 4, then sends it a DMA request signal, grants it the bus right, and halts. Upon receiving the DMA request signal and being given the bus right, the BitBlt circuit 17 begins transferring the data as requested by direct memory access. If the interrupt controller 9 does not generate a DMA stop signal during the data transfer, the BitBlt circuit 17 continues until the data transfer is completed, then returns the bus right to the CPU 15 so that the CPU 15 can resume operation. If the interrupt controller 9 generates a DMA stop signal during the data transfer, however, the BitBlt circuit 17 saves its internal status, then returns the bus right to the CPU 15 and halts.

The interrupt controller 9 generates the DMA stop signal in conjunction with certain interrupt request signals when it sends these interrupt request signals to the CPU 15. On receiving one of these interrupt request signals, the CPU 15 provides necessary interrupt service, which in the case of an interrupt request from the interface circuit 1 might comprise reading one byte of data from the interface circuit 1 and writing it in the frame buffer memory 4, then grants the bus right to the BitBlt circuit 17 again and sends the BitBlt circuit 17 a DMA restart signal, commanding it to resume the stopped DMA transfer.

Next the structure and operation of the BitBlt circuit 17 will be described in greater detail. As shown in FIG. 1, the BitBlt circuit 17 comprises a DMAC 18 which controls the operation of the BitBlt circuit 17, a DMA address generator 19, and a bit shifter and logic circuit 20. The DMAC 18 communicates with the CPU 15, from which it receives information via the bus 2 as well as via the DMA request and DMA restart signal lines. The DMAC 18 comprises a DMA stopping circuit 18a which enables and disables DMA operations according to the DMA restart and stop signals received from the main controller 8 and the interrupt controller 9. The DMA address generator 19 receives commands from the DMAC 18 and generates addresses in the character pattern memory 3 and frame buffer memory 4, causing data to be read from or written to those addresses. The data are read into or written from the bit shifter and logic circuit 20, which also performs bit shifts and other operations on these data according to commands received from the DMAC 18.

In the bit block transfer operation performed by the BitBlt circuit 17, a character pattern stored in a source block located on word boundaries in the character pattern memory 3 is transferred to a destination block located on bit boundaries in the frame buffer memory 4. The operation begins when the DMAC 18 receives parameters specifying the height and width of the source block and the location of the destination block from the CPU 15 via the bus 2, receives a DMA request signal, and is granted the bus right. On command from the DMAC 18, the DMA address generator 19 generates the first source address in the character pattern memory 3, the word at that address is transferred to a register in the bit shifter and logic circuit 20, the DMA address generator 19 generates the first destination address in the frame buffer memory 4, and the word at that address is transferred to another register in the bit shifter and logic circuit 20. The word read from character pattern memory 3 is bit-shifted to align it with the destination bit boundary and ORed with the word read from the frame buffer memory 4 to generate a result word, and the result word is written back to the same address in the frame buffer memory 4. The above operation is repeated a number of times equivalent to the block width, the source and destination addresses being incremented each time, to complete the transfer of one line of the block. The source and destination addresses are then changed to the first address in the next line of the block and that line transferred in the same way. The transfer of lines continues in this way for a number of times equal to the height of the block, at which point the bit block transfer is completed. The DMAC 18 then returns the bus right to the CPU 15.

If a DMA stop signal is received during a bit block transfer, the DMA stopping circuit 18a halts the transfer. The internal status of the BitBlt circuit 17, comprising parameters such as the block height and width, the size of the bit shift, and the current source and destination addresses, is saved by remaining held in registers in the BitBlt circuit 17, these registers being static devices that do not require refreshing. The DMAC 18 returns the bus right to the CPU 15, which can then recommence its own operations. When the CPU 15 is ready to allow the bit block transfer to continue, it sends a DMA restart signal to the DMA stopping circuit 18a, which causes the bit block transfer to resume from the point at which it was halted.

Figure 2:
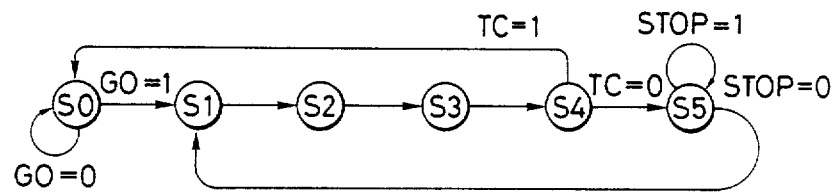
FIG. 2 is a state transition diagram of a DMA controller used in the page printer in FIG. 1.

The BitBlt circuit 17 can be embodied in a state machine with the five states illustrated in FIG. 2: an idle state S0, a source read state S1 for reading a word from the source block, a destination read state S3 for reading a word from the destination block, a bit shift state for bit-shifting the source word and ORing it with the destination word to generate a result word, a destination write state S4 for writing the result word back to the destination address, and a stop state in which the DMA transfer is stopped. The BitBlt circuit 17 is initially in the idle state S0. When a GO signal is generated, by a DMA request signal from the CPU 15 for example, a transition occurs from the idle state S0 to the source read state S1, then to the destination read state S2, then to the bit shift state S3, then to the destination write state S4. In the S4 state, after writing the destination word, the BitBlt circuit 17 checks whether the bit block transfer is complete. If it is (TC=1), a transition occurs from the destination write state S4 to the idle state S0. If the transfer is not complete (TC=0), a transition occurs to the stop state S5. Transitions from the stop state S5 are controlled by a STOP signal, the BitBlt circuit 17 remaining in the stop state S5 if the STOP signal is true and returning to the source read state S1 if the STOP signal is false. A simple way to implement the stop state S5 is to have the STOP signal disable the state clock of the state machine.

The STOP signal is generated by the DMA stopping circuit 18a, which can be, for example, a well-known J-K flip-flop circuit with the DMA stop signal as its J input, the DMA restart signal as its K input, and the STOP signal as its Q output. Thus the STOP signal is thus originally 0, changes to 1 when a DMA stop signal is received, and changes back to 0 when a DMA restart signal is received.

Techniques for building state machines are well known, so a description of the structural details of FIG. 2 will be omitted.

Next the interrupt controller 9 in FIG. 1 will be described in more detail. The main function of the interrupt controller 9 is to receive interrupt request signals and relay the interrupt request signal with the highest priority to the CPU 15. In addition, the interrupt controller 9 comprises a DMA stop signal generating circuit 91. For certain interrupts, when the interrupt controller 9 relays the interrupt request signal to the CPU 15, the DMA stop signal generating circuit 91 also sends a DMA stop signal to the DMA stopping circuit 18a.

Figure 3:
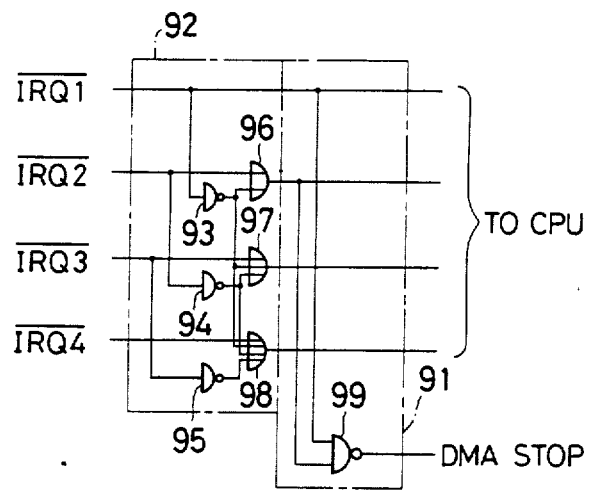
FIG. 3 is a schematic diagram of the interrupt controller in FIG. 1.

FIG. 3 is a drawing illustrating an example of a circuit that can be used as the interrupt controller 9 in FIG. 1. In this example there are four interrupt request sources, and the DMA stop signal is generated for the two interrupts with the highest priority. The interrupt controller 9 comprises two sections: the DMA stop signal generating circuit 91, and a priority circuit 92. The priority circuit 92 receives four interrupt request signals $\overline{IRQ1}$, $\overline{IRQ2}$, $\overline{IRQ3}$, and $\overline{IRQ4}$, among which $\overline{IRQ1}$ has the highest priority and $\overline{IRQ4}$ the lowest. These signals are active low, meaning that an interrupt is requested when the corresponding signal is in the low voltage state. The DMA stop signal generating circuit 91 comprises inverters 93, 94, and 95, the outputs of which are opposite in level to their inputs, OR gates 96, 97, and 98, the outputs of which are high when either of their inputs is high, and a NAND gate 99, the output of which is high when either of its inputs is low. The inverter 93 receives $\overline{IRQ1}$, inverts it, and provides it as an input to the OR gates 96, 97, and 98. The inverter 94 receives $\overline{IRQ2}$, inverts it, and provides it as an input to the OR gates 97 and 98. The inverter 95 receives $\overline{IRQ3}$, inverts it, and provides it as an input to the OR gate 98. The outputs of the OR gates are sent as interrupt request signals $\overline{IRQ1}$, $\overline{IRQ2}$, $\overline{IRQ3}$, and $\overline{IRQ4}$ to the CPU 15, these signals also being active low. $\overline{IRQ1}$ and the output of the OR gate 96 are furthermore connected as inputs to the NAND gate 99. The output of the NAND gate 99 is the DMA stop signal, which is active high.

This circuit operates as follows. Suppose first that $\overline{IRQ1}$ goes low to request an interrupt. The interrupt request signal $\overline{IRQ1}$ is relayed directly to the CPU 15. In addition, it is input to the NAND gate 99, the output of which therefore goes high, sending a DMA stop signal to the DMA stopping circuit 18a.

Suppose next that $\overline{IRQ2}$ goes low to request an interrupt. If $\overline{IRQ1}$ is high, then the output of the inverter 93 is low, so both inputs to the OR gate 97 are low, hence its output is low. Thus the interrupt request $\overline{IRQ2}$ is relayed to the CPU 15. In addition, the low output of the OR gate 97 is input to the NAND gate 99, sending a DMA stop signal to the DMA stopping circuit 18a. If $\overline{IRQ1}$ is low when IRQ2 goes low, however, then the output of the inverter 93 is high, so the output of the OR gate 96 is high and IRQ2 is not relayed to the CPU 15 or the NAND gate 99. That is, an $\overline{IRQ2}$ request is honored only if there is no $\overline{IRQ1}$ request.

Similarly, an $\overline{IRQ3}$ request is honored only if neither $\overline{IRQ1}$ nor $\overline{IRQ2}$ is requested, and an $\overline{IRQ4}$ request is honored only if none of the other interrupts is requested. IRQ3 and $\overline{\text{IRQ4}}$ do not cause output of the DMA stop signal.

Figure 4:
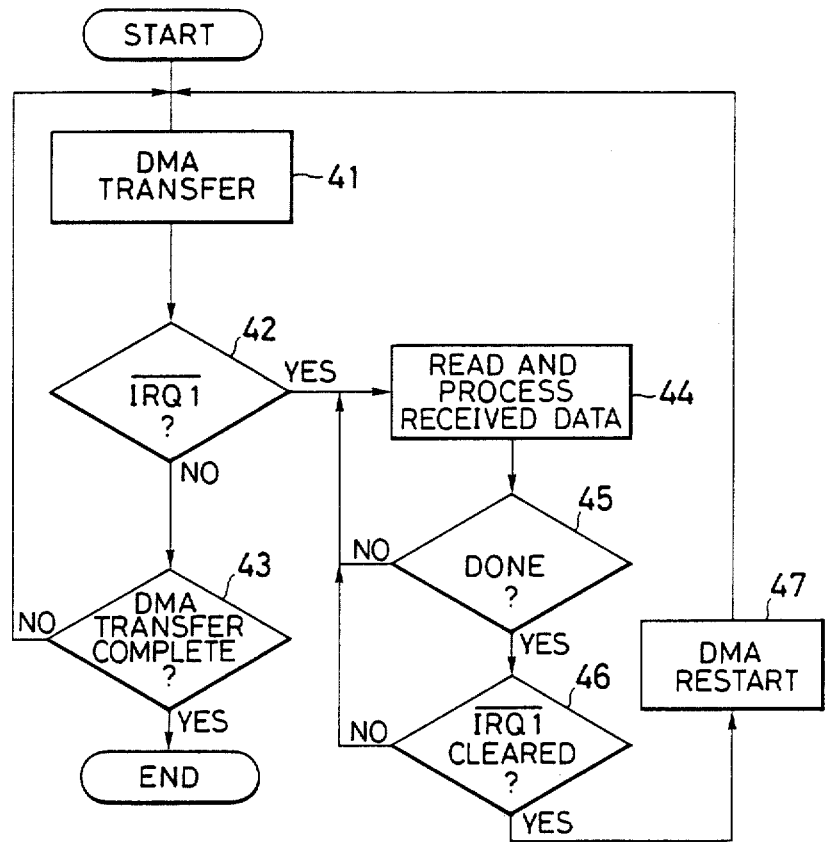
FIG. 4 is a flowchart illustrating the DMA stopping procedure of the page printer in FIG. 1.

FIG. 4 is a flowchart showing the operation of a page printer having an interrupt controller 9 like the one in FIG. 3 in which the interrupt request generated by the interface circuit 1 when a complete byte of data is received is IRQ1, illustrating in particular the method by which a DMA transfer is halted to allow the main controller 8 to read and process the received data. At the start of this flowchart, the main controller 8 starts a DMA transfer to execute a BitBlt. In the first step 41 one word is transferred by DMA. In second step 42 the interrupt controller 9 tests the $\overline{\text{IRQ1}}$ signal to see if the interface circuit 1 is requesting a data-received interrupt. If it is not, in the third step 43 the main controller 8 decides whether the DMA transfer has been completed. If the DMA transfer is not complete, the third step 43 loops back to the first step 41 to transfer another word by DMA. If the DMA transfer is complete, it ends.

If the interface circuit 1 is requesting a received-data interrupt when the interrupt controller 9 tests the $\overline{\text{IRQ1}}$ signal in the second step 42, then the interrupt controller 9 generates a DMA stop signal, stopping the DMA transfer, and the main controller 8 proceeds to the fourth step 44, in which it services the interrupt request by reading the received data from the interface circuit 1 and storing it in the frame buffer memory 4, for example, or otherwise processing the received data. In the fifth step 45, the main controller 8 decides whether interrupt service is complete, returning to the fourth step 44 if it is not. When processing of the received data is complete, in the sixth step 46 the main controller 8 checks IRQ1 to decide whether the interrupt request has been cleared; that is, to see if another byte of received data requires processing. If the interrupt request is cleared, in the seventh step 47 the main controller 8 restarts the DMA transfer, returning to the first step 41.

An advantage of the novel page printer evident from FIG. 4 is that it stops a DMA transfer only when necessary, and only for the necessary length of time. DMA transfers are completed more quickly than in the prior art because they are performed continuously, in burst mode, except when stopped. Transfer of the bus right between the CPU 15 and the DMAC 18 is held to the minimum necessary, thus saving time by reducing the number of overhead cycles. In particular, the novel page printer does not waste time by returning the bus right to the CPU 15 after every DMA cycle even when the CPU 15 cannot proceed with further processing until the DMA transfer is completed. For these reasons the novel page printer is able to operate more efficiently than a prior-art page printer and print more pages per minute.

A page printer may perform DMA transfers other than bit block transfers from the character pattern memory 3 to the frame buffer memory 4. DMA transfers may be used, for example in the read-out circuit 5 to transfer data from the frame buffer memory 4 to the mechanical control circuit 6.

Figure 5:
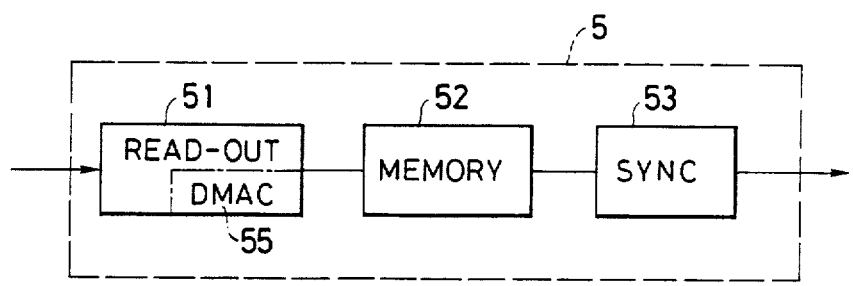
FIG. 5 is a block diagram of the read-out circuit in FIG. 1.

FIG. 5 shows the structure of the read-out circuit 5 in greater detail. The read-out circuit 5 comprises a main read-out circuit 51 for reading data from the frame buffer memory 4, a read-out buffer memory 52 in which the main read-out circuit 51 writes the data read from the frame buffer memory 4, and a synchronization circuit 53 that transfers the data from the read-out buffer memory 52 to the mechanical control circuit 6 in synchronization with the mechanical operation of the page printer.

The main read-out circuit 51 operates under control of the CPU 15 in the main controller 8, but to reduce the load on the CPU 15, the main read-out circuit 51 transfers data by direct memory access, so that the CPU 15 need only notify it of the amount of data to be transferred and the initial transfer address. The transfer is then performed by a read-out DMAC 55 in the main read-out circuit 51 without further control by the CPU 15. The read-out DMAC 55 is similar in structure to the DMAC in the main controller 8, and comprises a similar DMA stopping circuit for stopping DMA transfer operations in response to a DMA stop signal from the DMA stop signal generating circuit 91.

The read-out DMAC 55 and the DMAC 18 in the page printer can be part of the same physical unit, using the same DMAC hardware, which may serve still further DMA requests as well. In this case there will be multiple DMA request signals, with a priority relation among them, and the DMA stop signal from the interrupt controller 91 and the DMA restart signal from the CPU 15 must be capable of stopping and restarting all these DMA transfers.

Figure 6:
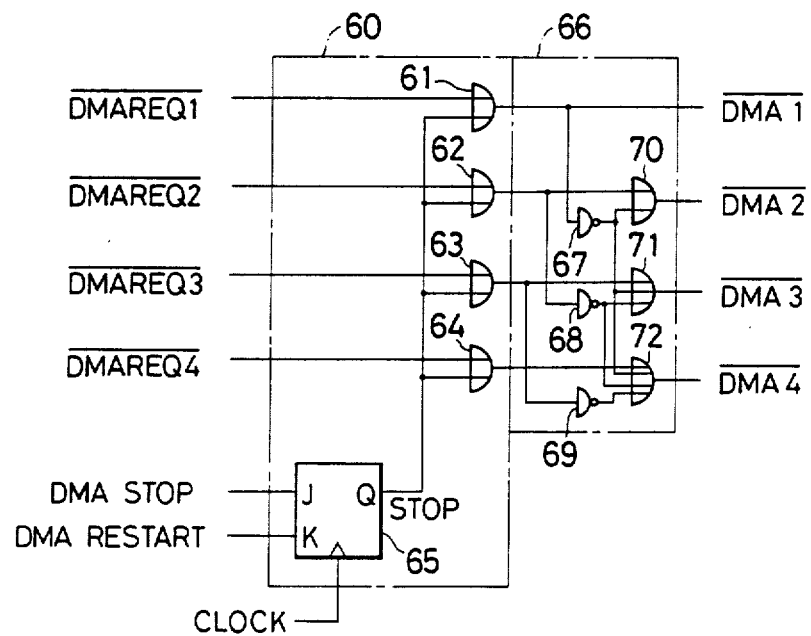
FIG. 6 is a schematic diagram of a multi-channel DMA stopping circuit.

FIG. 6 illustrates a multi-channel DMAC 60 that may be used when there are multiple DMA request signals $\overline{\text{DMAREQ1}}$, $\overline{\text{DMAREQ2}}$, $\overline{\text{DMAREQ3}}$, and $\overline{\text{DMAREQ4}}$, also showing a DMA priority circuit 66 for prioritizing the DMA requests. The multi-channel DMAC 60 comprises OR gates 61, 62, 63, and 64 for receiving respective DMA request signals $\overline{\text{DMAREQ1}}$, $\overline{\text{DMAREQ2}}$, $\overline{\text{DMAREQ3}}$, and $\overline{\text{DMAREQ4}}$, these signals being active low, and a J-K flip-flop 65. The J-K flip-flop 65 receives the DMA stop signal at its J input terminal and the DMA restart signal at its K input terminal and generates a STOP signal at its Q output terminal, which is connected to input terminals of all four of the OR gates 61, 62, 63, and 64. The STOP signal is thus initially low, goes high when a DMA stop signal is received, and goes low again when a DMA restart signal is received. While the STOP signal is high, the outputs of all four OR gates 61, 62, 63, and 64 are high.

When the STOP signal is low, the outputs of the OR gates 61, 62, 63, and 64 are in the same states as the input $\overline{\text{DMAREQ1}}$, $\overline{\text{DMAREQ2}}$, $\overline{\text{DMAREQ3}}$, and $\overline{\text{DMAREQ4}}$ signals, which are thus passed on to the DMA priority circuit 66. The DMA priority circuit 66 comprises inverters 67, 68, and 69 and OR gates 70, 71, and 72. These are interconnected and operate in the same way as the inverters 93, 94, and 95 and OR gates 96, 97, and 98 in FIG. 3, so further description will be omitted.

The operation of a page printer using the multi-channel DMAC 60 is similar to that already described. The STOP signal in FIG. 6 is normally low, enabling the DMA request signals and allowing DMA transfers to be performed. During a DMA transfer, if the interrupt controller 9 receives an interrupt request for which the DMA transfer must be stopped, it generates a DMA stop signal which causes the STOP signal to go high. This in turn causes the outputs of all the OR gates 61, 62, 63, 64, 70, 71, and 72 in FIG. 6 to go high, disabling all of the DMA request outputs. The current DMA transfer operation then stops, allowing the CPU 15 to service the interrupt. At the conclusion of interrupt service, the CPU 15 sends a DMA restart signal which resets the J-K flip-flop 65, causing the STOP signal to go low and thereby re-enabling the DMA request signals, so that the DMA transfer can resume.

A page printer employing the multi-channel DMAC circuit in FIG. 6 efficiently performs not only bit block transfers from the character pattern memory to the frame buffer memory but a variety of other DMA transfers as well, performing all these DMA transfers in burst mode, stopping them only when necessary to allow the CPU to service an interrupt request.

A further advantage of this invention is that the manufacture of the novel page printer does not require extensive changes to existing printer designs. Basically, it is only necessary to add the J-K flip-flop 65, the NAND gate 99, and OR gates such as the OR gates 61, 62, 63, and 64 to the printer hardware, and make simple modifications in the interrupt service routines stored in the instruction ROM 16 to have the CPU 15 send a DMA restart signal to the DMA stopping circuit 18a. The novel page printer can therefore be produced using substantially the same manufacturing facilities as in the prior art.

The scope of this invention is not restricted to the apparatus shown in the drawings and described above, but includes many modifications and variations that will be apparent to one skilled in the art. In particular, FIGS. 2, 3, and 6 illustrate possible structures of the DMAC, the DMA stop signal generating circuit, and the DMA stopping circuit; they do not restrict these circuits to the structures shown. The flowchart in FIG. 4 is also illustrative in nature, and does not show all steps that would actually be performed, such as steps for handling interrupt requests other than IRQ1. Also, when a DMA operation is stopped, the DMAC can save its internal status to a separate memory device, instead of holding it in static internal registers, and restore its internal status from this separate memory device when a DMA restart signal is received; this modification enables dynamic registers to be used in the DMAC. The character pattern memory can store information other than character patterns, and it also possible for the character pattern memory to be partly or wholly contained within the frame buffer memory, in which case data transfers from the character pattern memory to the frame buffer memory take the form of transfers from one part of the frame buffer memory to another. It will also be apparent that the method of stopping DMA operations in this invention can be used to improve the speed of DMA transfers in devices other than page printers.

What is claimed is:

1. A page printer, comprising:
   an interface circuit for receiving data from external apparatus and generating interrupt request signals;
   a bus, connected to said interface circuit, for transferring data;
   a character pattern memory, connected to said bus, for storing data such as character patterns;
   a frame buffer memory, connected to said bus, for reading and writing data;
   a read-out circuit, connected to said bus, for reading data from said frame buffer memory;
   a mechanical control circuit for receiving information from said read-out circuit and generating control signals;
   a printing mechanism for receiving said control signals and printing according to them;
   a CPU, connected to said bus, for receiving interrupt request signals, processing data, and generating signals including a DMA request signal and a DMA restart signal;
   a BitBlt circuit, connected to said CPU and said bus, for performing DMA transfers in response to said DMA request signal;
   a DMA stopping circuit, disposed in said BitBlt circuit, for stopping and restarting said DMA transfers in response to a DMA stop signal and said DMA restart signal;
   an interrupt controller, connected to said interface circuit and said CPU, for receiving interrupt request signals such as the interrupt request signals generated by said interface circuit, selecting one of them, and sending the selected interrupt request signal to said CPU; and
   a DMA stop signal generating circuit, disposed in said interrupt controller, for generating said DMA stop signal based on certain of the interrupt request signals received by said interrupt controller.

2. A page printer according to claim 1, wherein said interface circuit generates an interrupt request signal when it has received one complete byte of data, and said DMA stop signal generating circuit generates said DMA stop signal when this interrupt request signal is selected.

3. A page printer according to claim 1, wherein said interrupt request signals are active low and said DMA stop signal generating circuit comprises a NAND gate whose inputs are based on certain of the interrupt request signals received by said interrupt controller.

4. A page printer according to claim 1, wherein said DMA request signal is active low and DMA stopping circuit comprises:
   a J-K flip-flop for receiving said DMA stop signal at its J input and said DMA restart signal at its K input and generating a Q output; and
   at least one OR gate for receiving said Q output and ORing it with said DMA request signal.

5. A page printer according to claim 1, in which said read-out circuit also generates a DMA request signal and sends it to said BitBlt circuit, and said BitBlt circuit also performs DMA transfers in response to this DMA request signal.

6. A method of controlling a DMA transfer of a specified number of words of data from a source block to a destination block according to GO and STOP signals, comprising:
   a first step of waiting in an idle state for said GO signal;
   a second step of reading a word from said source block;
   a third step of reading a word from said destination block;
   a fourth step of performing operations on the words read in said second step and said third step, thus generating a result word;
   a fifth step of writing said result word to said destination block, then returning to said first step if said specified number of words have been transferred; and
   a sixth step of returning to said second step is said STOP signal is false and remaining in said sixth step if said STOP signal is true.

7. A method of performing a DMA transfer of words of data and servicing an interrupt request, comprising:
   a first step of transferring a word by DMA;
   a second step for stopping said DMA transfer if said interrupt request is present;
   a third step of deciding whether said DMA transfer is completed and returning to said first step if it is not;

a fourth step, performed when said DMA transfer is stopped in said second step, of providing interrupt service;

a fifth step for deciding whether said interrupt service is complete and returning to said fourth step if it is not;

a sixth step of deciding whether said interrupt request has been cleared and returning to said fourth step if it has not; and a seventh step of restarting said DMA transfer by returning to said first step.

8. The method of claim 7, wherein said interrupt request is generated by an interface circuit and said interrupt service comprises reading a byte of data from said interface circuit and processing it.

* * * * *